United States Patent [19]

Irwin

[11] 4,176,223
[45] Nov. 27, 1979

[54] POLYIMIDE-ESTERS AND FILAMENTS PREPARED FROM 4-(4'-CARBOXYPHTHALIMIDO)BENZOIC ACID OR 4-(4'-HYDROXYPHTHALIMIDO)PHENOL

[75] Inventor: Robert S. Irwin, Wilmington, Del.

[73] Assignee: E. I. Du Pont de Nemours and Company, Wilmington, Del.

[21] Appl. No.: 970,234

[22] Filed: Dec. 18, 1978

[51] Int. Cl.$^2$ .............................................. C08G 73/16
[52] U.S. Cl. ..................................... 528/170; 528/271
[58] Field of Search ................................. 528/170, 271

[56] References Cited

U.S. PATENT DOCUMENTS

| | | | |
|---|---|---|---|
| 3,536,670 | 10/1970 | Aelony et al. | 528/170 |
| 3,542,731 | 11/1970 | Culbertson | 528/170 |
| 3,567,685 | 3/1971 | Bialous et al. | 528/170 |
| 4,101,488 | 7/1978 | Ishiyuka et al. | 528/170 |
| 4,119,605 | 10/1978 | Keating | 528/170 |

*Primary Examiner*—Lester L. Lee

[57] ABSTRACT

High modulus filaments are melt-spun from polyimide-esters derived from 2,6-naphthalene dicarboxylic acid and either a substituted diphenol and 4-(4'-carboxyphthalimido)benzoic acid or terephthalic acid and 4-(4'-hydroxyphthalimido)phenol. The polyimide esters are optically anisotropic in the melt. As-spun filaments from these polymers can be heat treated while free from tension to increase their tenacity.

5 Claims, No Drawings

POLYIMIDE-ESTERS AND FILAMENTS PREPARED FROM 4-(4'-CARBOXYPHTHALIMIDO)BENZOIC ACID OR 4-(4'-HYDROXYPHTHALIMIDO)PHENOL

BACKGROUND OF THE INVENTION

1. Field of the Invention

This invention pertains to filament-forming melt-spinnable polyimide-esters and to high modulus filaments thereof.

2. Description of the Prior Art

A class of aromatic polyesters that form optically anisotropic melts from which oriented filaments can be melt-spun has been described in Schaefgen U.S. Pat. No. 4,118,372. These polyesters are derived primarily from para-oriented dihydric phenols and para-oriented aromatic dicarboxylic acids. Filaments that are melt-spun from such polyesters can be heat treated to high tenacity and modulus.

This invention provides a different class of anisotropic-melt-forming polymers which can be melt-spun into filaments of high as-spun modulus, i.e., greater than 177 dN/tex. The novel filaments can also be heat treated to increase tenacity while retaining moduli in excess of 177 dN/tex.

Polyimide-ester from 4-(4'-carboxyphthalimido) benzoic acid and ethylene glycol as disclosed in U.S. Pat. No. 3,377,321 is said to be useful for coatings and fibers. Polyimide-esters are also mentioned in U.S. Pat. No. 3,542,731. The chemical structures of the polymers of such patents are quite distinct from those of the present invention.

SUMMARY OF THE INVENTION

The present invention is directed to fiberforming polyimide-esters consisting essentially of units having the structural formulas

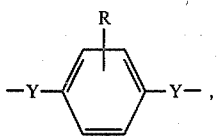

I

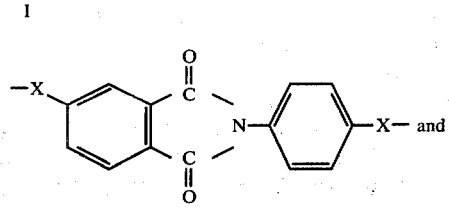

II

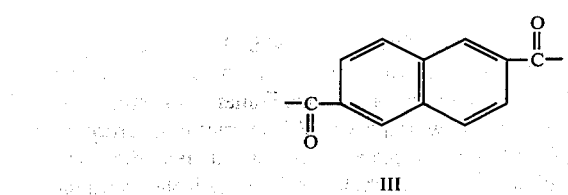

III such that when X is

Y is —O—; R is Cl or 1 to 2 carbon alkyl; unit III is present in an amount of from 5–20 mole percent based on the total number of moles of units; and the sum of moles of units II and III is substantially equal to the number of moles of unit I; and when X is —O—; Y is

R is H; unit III is present in an amount of from 5–20 mole percent based on the total number of moles of units; and the sum of moles of units I and III is substantially equal to the number of moles of unit II. It also relates to high modulus filaments of such polyimide-esters.

DETAILED DESCRIPTION OF THE INVENTION

One group of polyimide-esters of the present invention consists essentially of

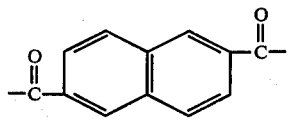

units derived from 2,6-naphthalene dicarboxylic acid or derivatives thereof;

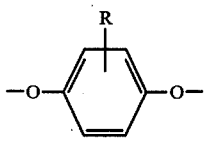

units derived from substituted hydroquinones or derivatives thereof; and

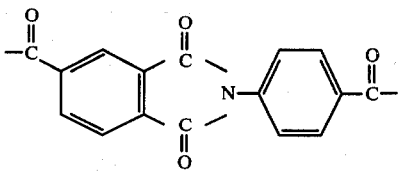

units derived from 4-(4'-carboxyphthalimido) benzoic acid (referred to herein as TB-acid), or derivatives thereof. Another group of polyimide esters of this invention consists essentially of

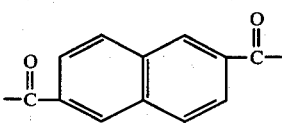

units derived from 2,6-naphthalene dicarboxylic acid or derivatives thereof;

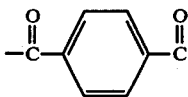

units from terephthalic acid or derivatives thereof; and

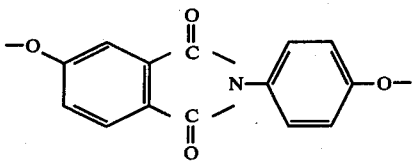

units from 4-(4'-hydroxyphthalimido)phenol (referred to herein as TB-phenol) or derivatives thereof. The polyimide-esters of the invention are capable of forming optically anisotropic melts as defined in the aforementioned Schaefgen patent and have a molecular weight sufficient for melt-spinning into filaments.

POLYMERIZATION CONDITIONS

The polyimide-esters of the invention may be prepared by standard melt polymerization techniques from the reactant precursors in such proportions that the moles of phenolic reactant(s) are substantially equal to the moles of acidic reactant(s) described above. Details of the procedure are found in the examples below. In general, polymerization conditions such as temperature, duration of heating, pressures, etc., may be varied depending on the reactants employed and the degree of polymerization desired. Normally an inherent viscosity $\eta_{inh}$ of at least 0.4 measured as described below in adequate for filament formation.

FILAMENT PREPARATION

The polyimide-esters may be spun into filaments by conventional melt-spinning techniques. A melt of the polymer is extruded through a spinneret into a quenching atmosphere (e.g., air or nitrogen maintained at room temperature) and wound up. General spinning conditions are given in the aforementioned Schaefgen patent.

As used herein, the term "as-spun" filament refers to a filament which has not been drawn or heat-treated after extrusion and normal windup. The as-spun and heat-treated filaments of the invention have exceptional moduli, over 177 dN/tex.

HEAT TREATMENT AND UTILITY

The as-spun filaments of this invention may be subjected to heat treatment in an oven while relaxed to provide high strength filaments useful for a variety of industrial applications such as plastic and rubber reinforcement. In the heat treating process, loosely collected filament (on soft yielding bobbins, as skeins, as piddled packages, etc.) are usually heated in an inert atmosphere that is continuously purged by flow of inert gas through the oven to remove by-products from the vicinity of the filament. Temperatures approaching the fusion point but sufficiently below to prevent interfilament fusion are employed. Preferably the maximum temperature is reached in a stepwise fashion.

MEASUREMENTS AND TESTS

Inherent viscosity ($\eta_{inh}$) is defined by the following equation:

$$\eta_{inh} = \ln(\eta_{rel})/C$$

wherein ($\eta_{rel}$) represents the relative viscosity and C represents a concentration of 0.5 gram of the polymer in 100 ml of solvent. The relative viscosity ($\eta_{rel}$) is determined by dividing the flow time in a capillary viscometer of the dilute solution by the flow time for the pure solvent. Flow times are determined at 30° C., and the solvent is p-chlorophenol.

Filament tensile properties are reported in the Examples in the SI-system of units; i.e., size in "tex", tenacity (T) and initial modulus ($M_i$) in "dN/tex," and elongation-at-break (E) as percent of unstretched length. They are measured on filaments that have been conditioned at least one hour using the general procedures shown in Morgan U.S. Pat. No. 3,827,998 adapted to SI nomenclature.

The following examples are illustrative of the present invention.

EXAMPLE I

This example illustrates preparation of filaments using polyesters formed from polycondensation of methylhydroquinone with a mixture of TB-acid and another cyclic dicarboxylic acid (Z). Table I summarizes results wherein z is the concentration of Z-units expressed as mole fractions of total dicarboxylic acid units.

The polymer for Example I-A was obtained as follows. Into a 250 mL flask equipped with a stirrer, slow nitrogen flush, a distillation condenser, and a Wood's metal bath for heating, was placed 15.58 g (0.075 mole) of methylhydroquinone diacetate, 3.02 g (0.014 mole) of 2,6-naphthalene dicarboxylic acid, and 17.42 g (0.056 mole) of TB-acid. The mixture was heated from 301° to 355° C. over a period of 59 min. with removal of acetic acid by distillation. A vacuum (pressure=0.27 kPa) was then applied, holding temperature at 355° C. for 25 min and then raising it to 366° C. over an additional 14 min period. This polymerization sequence is summarized in tabular form in Table I. Polyester so obtained was molded into a right-circular cylinder of 22 mm diameter, heated to 346° C., and extruded through the single 0.23 mm diameter orifice of a spinneret heated at 364°–372° C. Filament was continuously would at 549 m/min. Properties of the "As Spun" filament are shown in Table I. A skein of the filament was heated in nitrogen for 1.5 hr at 240° C., 1.5 hr at 260° C., 1 hr at 280° C., and 17 hr at 290° C., sequentially. This heating is shown tabularly under "Heat Treatment" in Table I. Properties of the "Heat Treated" filament at 21° C. are also shown.

Except for differences noted in Table I, Examples IB and IC were carried out as for IA, and all three produced as-spun high-modulus filament of useful tenacity.

Polyesters were prepared from methylhydroquinone, TB-acid, and (in place of 2,6-naphthalene dicarboxylic acid) either terephthalic or hexahydroterephthalic or chloroterephthalic or bibenzoic acid. Satisfactory melt-spun filaments were not obtained.

TABLE I

Polyesters $\left[-O-R_1-O-\overset{O}{\underset{\|}{C}}-R_2-\overset{O}{\underset{\|}{C}}-\right]$ where $R_1$ is

[methylphenylene structure with CH₃ substituent]

and $R_2$ is [phthalimide-N-phenylene structure] $_{(1-z)}$ and [naphthalene-2,6-diyl structure] $_z$

| Example I | z | Polymerization °C./min/kPa | $\eta_{inh}$ |
|---|---|---|---|
| A | 0.2 | 301–355/59, 355/25/0.27, 355–366/14/0.27 | 1.16 |
| B | 0.25 | 304–342/42, 342/9/vacuum, 342/14/0.27 | 0.9 |
| C | 0.3 | 257–355/49, 355–330/12/0.27, 330/42/0.27 | 0.88 |

| Example I | Spinneret Temp. °C. | As-Spun tex | T dN/tex | E % | Mi dN/tex |
|---|---|---|---|---|---|
| A | 364–372 | 1.33 | 5.02 | 1.21 | 454 |
| B | 332 | 1.53 | 3.49 | 0.85 | 422 |
| C | 325–332 | 2.54 | 3.58 | 1.05 | 334 |

| Example I | Heat Treatment °C./hr. | Heat Treated T dN/tex | E % | Mi dN/tex |
|---|---|---|---|---|
| A | 240/1.5, 260/1.5, 280/1, 290/17 | 8.0 | 2.03 | 461 |
| B | 245/1, 260/1, 280/1.5, 295/1, 305/6 | 8.5 | 2.53 | 405 |
| C | 240/1, 265/1, 280/1.5, 305/2.25, 295/6 | 5.53 | 2.00 | 292 |

EXAMPLE II

This example was performed in a manner similar to that described in Example IA except that, in place of methylhydroquinone, other substituted hydroquinones as indicated in Table II were employed. Tests have shown that, as the alkyl substituent on the monosubstituted hydroquinone increases in length, the melting point of resultant polymer decreases. The use of hydroquinone, i.e., no substituent at all, resulted in a polymer having too high a melting point for melt spinning.

TABLE II

Polyesters $\left[-O-R_1-O-\overset{O}{\underset{\|}{C}}-R_2-\overset{O}{\underset{\|}{C}}-\right]$ where $R_1$ is

[phenylene with X substituent]

and $R_2$ is [phthalimide-N-phenylene] $_{(1-z)}$ and [naphthalene-2,6-diyl] $_z$

| Example II | X | z | Polymerization °C./min/kPa | $\eta_{inh}$ |
|---|---|---|---|---|
| A | CH₃CH₂— | 0.125 | 306–351/55, 351–350/55/0.27 | 1.09 |
| B | CH₃CH₂— | 0.175 | 295–340/37, 340–350/56/0.27 | 1.39 |
| C | Cl— | 0.25 | 309–365/87, 365/7/0.27 | 1.24 |

| Example II | Spinneret Temp. °C. | As-Spun tex | T dN/tex | E % | Mi dN/tex |
|---|---|---|---|---|---|
| A | 332* | 0.44 | 3.76 | 1.18 | 345 |
| B | 320–325 | — | — | — | — |
| C | 365–385 | 1.02 | 4.55 | 1.00 | 497 |

| Example II | Heat Treatment °C./hr. | Heat Treated T dN/tex | E % | Mi dN/tex |
|---|---|---|---|---|
| A | 205/18 | 2.59 | 1.00 | 310 |
| B | — | — | — | — |
| C | 200/1, 250/1.5, 270/1, 290/1, 305/8 | 10.73 | 2.17 | 583 |

*temperature of polymer melt

EXAMPLE III

This example essentially repeats the copolymer test IA except that a 50/50 (mol) mixture of methylhydroquinone and chlorohydroquinone was used in place of 100% methylhydroquinone (see Table III). Excellent results are obtained. Not only was the as-spun filament high in both tenacity and modulus, but both properties increased substantially on heat-treatment relaxed in nitrogen atmosphere.

TABLE III

Polyesters $\left[-O-R_1-O-\overset{O}{\underset{\|}{C}}-R_2-\overset{O}{\underset{\|}{C}}-\right]$ where $R_1$ is

[methyl-substituted phenylene] and [chloro-substituted phenylene] (50/50) and

TABLE III-continued

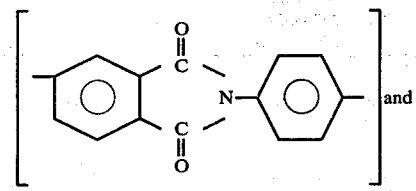

| Polymerization °C./min | $\eta_{inh}$ | Spinneret Temp. °C. |
|---|---|---|
| 320–351/150 | 0.69 | 382 |

As-Spun

| tex | T dN/tex | E % | Mi dN/tex | Heat Treatment °C./hr |
|---|---|---|---|---|
| 2.83 | 2.81 | 0.81 | 351 | 200/2, 250/1.5, 260/1, 270/1, 280/8 |

Heat Treated

| T dN/tex | E % | Mi dN/tex |
|---|---|---|
| 7.27 | 1.76 | 463 |

EXAMPLE IV

In this example, TB-phenol rather than TB-acid was used in the preparation of polyester (see Table IV) according to the general procedure of Example IA. TB-phenol (in the form of the diacetate) was prepared as follows:

(a) 4-Hydroxyphthalic Acid

In a stainless steel beaker with a steel stirrer a mixture of 300 g KOH (5.36 mole), 150 g NaOH (3.75 mole), 120 g of a 50% aqueous solution of 4-sulfophthalic acid (~0.25 mol) was heated for 4 hr on an oil bath. It was then cooled such that it remained molten and poured into 600 ml ice + water. With cooling it was neutralized to pH 9.0 without noting any precipitate of m-hydroxybenzoic acid by-product. It was then acidified, evaporated to dryness in a rotary evaporator and extracted in a Soxhlet to separate the soluble product from the insoluble inorganics. Crude yield 26 g (59%, M.P. 175°–180° C. Recrystallized from ~2 vol boiling water. Yield 19.5 g (44%), M.P. 201°–3° C.

(b) 4-Hydroxyphthalic Anhydride

In a stirred 500 ml flask the crude 4-hydroxyphthalic acid was heated at 205°–210° C., (just above the M.P.) under $N_2$ in a Woods metal bath till all bubbling ceased (1.5 hr). The product M.P. 164°–7° C. was sufficiently pure for further use. Yield 100%.

(c) 4-(4'-Hydroxyphthalimido)phenol

In a stirred dry flask under $N_2$, to a solution of 54.5 g p-aminophenol (0.5 mole) in 500 ml dry pyridine was added over 10 min at room temperature 82.0 g powdered 4-hydroxyphthalic anhydride (0.31 mole) and the mixture refluxed 5 hr. This black solution was cooled, poured into 1500 ml water, acidified with HCl, filtered, washed, and dried. M.P. 302°–304° C. Recrystallization was unnecessary. Yield 104 g, 82%.

(d) 4-(4'-Acetoxyphthalimido)phenyl Acetate (diacetate of TB-phenol)

Acetylation of the diol (104 g; 0.40 mole) with 300 ml $Ac_2O + 10$ drops $H_2SO_4$ and 30 min/100° C., and isolation by precipitation in water, gave a crude product, M.P. 185°–199° C. Recrystallization from dimethylformamide gave M.P. 196°–8° C. Yield 101 g, 82%.

A mixture of 18.10 g (0.053 mol) of the diacetate of TB-phenol, 6.23 g (0.038 mol) of terephthalic acid, and 2.70 g (0.012 mol) of 2,6-naphthalene dicarboxylic acid was polymerized. The polymer, spun essentially as described for Example IA, yielded as-spun filament of useful tenacity and high modulus. On relaxed heat-treatment in nitrogen atmosphere, tenacity increased by a factor of about 2.

Example IVB essentially repeats IVA except that the polymer was not actually melt spun. Instead, filament was pulled directly from the melt at 316° C. by withdrawing a glass rod. This performance indicates the polymer is excellently suited for melt-spinning.

Homopolymer based on TB-phenol and terephthalic acid was found to have too high a melting point to be melt spinnable.

TABLE IV

Polyesters $\left[-O-R_1-O-\overset{O}{\underset{\|}{C}}-R_2-\overset{O}{\underset{\|}{C}}-\right]$ where $R_1$ is

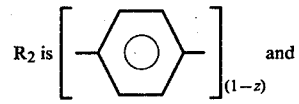

$R_2$ is 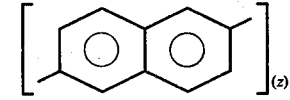

| Example IV | z | Polymerization °C./min/kPa | Spinneret Temp. °C. |
|---|---|---|---|
| A | 0.25 | 315–340/55, 340–350/50/0.27 | 382 |
| B | 0.3 | 305–330/52, 330/18/0.27 | — |

As-Spun

| Example IV | tex | T dN/tex | E % | Mi dN/tex |
|---|---|---|---|---|
| A | 1.26 | 5.35 | 1.78 | 342 |
| B | — | — | — | — |

Heat Treated

| Example IV | Heat Treatment °C./hr | T dN/tex | E % | Mi dN/tex |
|---|---|---|---|---|
| A | 230/2, 250/2, 270/1, 290/1, 305/8 | 10.51 | 3.13 | 360 |
| B | — | — | — | — |

What is claimed is:
1. A filament-forming polyimide-ester consisting essentially of units having the structural formulas

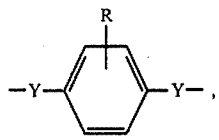

I

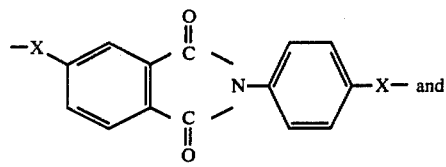

II

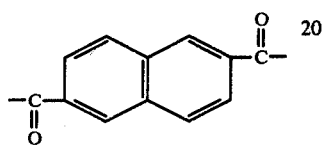

III such that when X is

Y is —O—; R is Cl or 1 to 2 carbon alkyl; unit III is present in an amount of from 5-20 mole percent based on the total number of moles of units; and the sum of moles of units II and III is substantially equal to the number of moles of unit I; and when X is —O—; Y is

R is H; unit III is present in an amount of from 5-20 mole percent based on the total number of moles of units; and the sum of moles of units I and III is substantially equal to the number of moles of unit II.

2. The polymer of claim 1 wherein X is

Y is —O—; and R is methyl.

3. The polymer of claim 1 wherein X is

Y is —O—; and R is Cl.

4. The polymer of claim 1 wherein X is —O—; Y is

and R is hydrogen.

5. A filament of a polymer according to claim 1 having a modulus of at least 177 dN/tex.

* * * * *